(12) United States Patent
Wang (10) Patent No.: US 12,465,124 B2
(45) Date of Patent: Nov. 11, 2025

(54) PROTECTIVE CASE AND PORTABLE ELECTRONIC DEVICE

(71) Applicant: Getac Technology Corporation, New Taipei (TW)

(72) Inventor: Shih-Wei Wang, Taipei (TW)

(73) Assignee: GETAC TECHNOLOGY CORPORATION, New Taipei (TW)

( * ) Notice: Subject to any disclaimer, the term of this patent is extended or adjusted under 35 U.S.C. 154(b) by 140 days.

(21) Appl. No.: 18/223,591

(22) Filed: Jul. 19, 2023

(65) Prior Publication Data

US 2024/0237793 A1 Jul. 18, 2024

(30) Foreign Application Priority Data

Jan. 13, 2023 (CN) .......................... 202310064070.2

(51) Int. Cl.
  *A45C 11/00* (2006.01)
  *A45C 13/36* (2006.01)

(52) U.S. Cl.
  CPC .............. *A45C 11/00* (2013.01); *A45C 13/36* (2013.01); *A45C 11/002* (2025.01); *A45C 11/003* (2025.01)

(58) Field of Classification Search
  CPC ..... A45C 11/00; A45C 11/002; A45C 11/003; A45C 13/36
  USPC ................ 206/320, 453, 454, 477, 521, 586
  See application file for complete search history.

(56) References Cited

U.S. PATENT DOCUMENTS

| 5,299,685 | A  | * | 4/1994  | Chin ..................... | B65D 81/02 |
|           |    |   |         |                          | 206/320    |
| 10,778,825| B2 | * | 9/2020  | Luiten .................. | H04M 1/667 |
| 10,893,131| B2 |   | 1/2021  | Chiang                   |            |
| 2012/0261289 | A1 | * | 10/2012 | Wyner ................. | A45C 11/00 |
|           |    |   |         |                          | 206/320    |

(Continued)

FOREIGN PATENT DOCUMENTS

| CN | 105747436 A | 7/2016 |
| CN | 209086812 U | 7/2019 |

(Continued)

OTHER PUBLICATIONS

European Patent Office, EU23186700.3 (Jun. 7, 2024), Germany.

(Continued)

*Primary Examiner* — Rafael A Ortiz
(74) *Attorney, Agent, or Firm* — troutman pepper locke; Tim Tingkang Xia, Esq.

(57) ABSTRACT

A protective case includes a plurality of buffer pads and a plurality of connectors. The plurality of buffer pads together surround and form an accommodation space. Each of the plurality of buffer pads includes an elastic clamping part, which includes an upper buffer plate, a lower buffer plate and a side buffer plate. Two opposite sides of the side buffer plate are connected to the upper buffer plate and the lower buffer plate, respectively. Each of the upper buffer plates, the lower buffer plates and the side buffer plates together forms a clamping space. An exposed space portion is formed between any two of the plurality of buffer pads. The plurality of connectors are located in the exposed space portions, respectively. Two ends of each of the plurality of connectors are connected to any two of the plurality of buffer pads, respectively.

14 Claims, 10 Drawing Sheets

(56) References Cited

U.S. PATENT DOCUMENTS

| | | | |
|---|---|---|---|
| 2013/0206633 A1* | 8/2013 | Jensen | A45C 11/00 |
| | | | 206/521 |
| 2016/0021996 A1* | 1/2016 | Tien | B65D 81/053 |
| | | | 224/191 |
| 2017/0049199 A1* | 2/2017 | Kim | A45C 13/36 |
| 2017/0172267 A1* | 6/2017 | Bong | A45C 11/00 |
| 2017/0303653 A1* | 10/2017 | Roberts | A45C 11/00 |
| 2019/0310049 A1* | 10/2019 | Stilson | F41B 9/0071 |
| 2020/0351396 A1 | 11/2020 | Poon et al. | |
| 2020/0366331 A1* | 11/2020 | Chen | H04M 1/0268 |
| 2021/0126666 A1* | 4/2021 | Ng | G06F 1/1626 |
| 2022/0158681 A1 | 5/2022 | Fathollahi | |
| 2023/0318653 A1* | 10/2023 | Khalifeh | C08J 5/244 |
| | | | 455/575.1 |

FOREIGN PATENT DOCUMENTS

| | | |
|---|---|---|
| CN | 215125083 U | 12/2021 |
| CN | 217355381 U | 9/2022 |
| KR | 101502272 B1 | 3/2015 |
| KR | 102116885 B1 | 6/2020 |
| KR | 102214163 B1 | 2/2021 |
| TW | M474320 U | 3/2014 |
| TW | M571637 U | 12/2018 |
| TW | M571639 U | 12/2018 |
| TW | M587422 U | 12/2019 |
| WO | 2011095886 A1 | 8/2011 |

OTHER PUBLICATIONS

Taiwan Patent Office, "Office Action", Oct. 11, 2023, Taiwan.
Taiwan Patent Office, "NOA-112101581". (Oct. 29, 2024).
Examination Report issued by the IPO (Australia), Aug. 23, 2024.
Examination Report issued by the IPO(Australia) on Jul. 9, 2025.

* cited by examiner

PROTECTIVE CASE AND PORTABLE ELECTRONIC DEVICE

CROSS-REFERENCE TO RELATED APPLICATIONS

This non-provisional application claims priority under 35 U.S.C. § 119(a) on Patent Application No(s). 202310064070.2 filed in China, on Jan. 13, 2023, the entire contents of which are hereby incorporated by reference.

TECHNICAL FIELD

The present disclosure relates to a protective case, more particularly to a protective case mounted on a portable electronic device.

BACKGROUND

Portable electronic devices such as smartphones, tablet computers or notebook computers, have become indispensable electronic products in daily life since the portable electronic devices are easy to carry so that users can do various tasks matters via the portable electronic devices anytime and anywhere. With the advancement of technology and the increasingly sophisticated electronic components, most of the portable electronic devices are not shock resistant. If the fragile sides or corners of the portable electronic devices hit the ground or other objects, the display panel and internal electronic components of the portable electronic devices can be easily damaged. Therefore, some portable electronic devices have a basic shockproof design.

Most of the portable electronic devices produced by manufacturers are designed to strengthen the protection of four corners of the portable electronic devices. However, the protection for four sides of the portable electronic devices is insufficient. If the portable electronic devices, such as tablet computers or notebook computers used in a fire truck or an ambulance, are used in an environment with high-vibration, the aforementioned basic shockproof design cannot fully protect the portable electronic devices. The portable electronic devices may be damaged due to accidentally hitting of the four sides of the portable electronic devices by ambulance crew during emergency rescue or bumpy roads.

SUMMARY

The present disclosure provides a protective case to protect sides of a portable electronic device, so as to protect provide comprehensive protection for the portable electronic device, thereby preventing the portable electronic device from being damaged due to mechanical shocks.

One embodiment of the present disclosure provides a protective case including a plurality of buffer pads and a plurality of connectors. The plurality of buffer pads together surround and form an accommodation space. Each of the plurality of buffer pads includes an elastic clamping part. The elastic clamping part includes an upper buffer plate, a lower buffer plate and a side buffer plate. Two opposite sides of the side buffer plate are connected to the upper buffer plate and the lower buffer plate, respectively, and each of the upper buffer plates, the lower buffer plates and the side buffer plates together forms a clamping space. An exposed space portion is formed between any two of the plurality of buffer pads which are adjacent to each other. The plurality of connectors are located in the exposed space portions, respectively, and two ends of each of the plurality of connectors are connected to any two of the plurality of buffer pads which are adjacent to each other, respectively.

Another embodiment of the present disclosure provides a portable electronic device including a device body and a protective case. The protective case is mounted on the device body, and includes a plurality of buffer pads and a plurality of connectors. The plurality of plurality of buffer pads together form an accommodation space. The device body is accommodated in the accommodation space. Each of the plurality of buffer pads comprises an elastic clamping part. The elastic clamping part comprises an upper buffer plate, a lower buffer plate and a side buffer plate. Two opposite sides of the side buffer plate are connected to the upper buffer plate and the lower buffer plate, respectively, and each of the upper buffer plates, the lower buffer plates and the side buffer plates together forms a clamping space. A side of the body is clamped by the elastic clamping part in the clamping space. The exposed space portion is formed between any two of the plurality of buffer pads which are adjacent to each other. The plurality of connectors are located in the exposed space portions, respectively, and two ends of each of the plurality of connectors are connected to any two of the plurality of buffer pads which are adjacent to each other, respectively. The exposed space portions expose corners of the device body.

According to the protective case and the portable electronic device as described above, since the protective case provides additional protection to the sides of the body, if the side of the device body hits the ground or other objects, the buffer pads of the protective case may buffer and absorb the shock. Therefore, in addition to the corners of device body with the function of the shockproof, the protective case may protect the sides of the portable electronic device so as to provide comprehensive protection for the portable electronic device, thereby preventing the portable electronic device from being damaged due to mechanical shocks.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In addition, the terms used in the present disclosure, such as technical and scientific terms, have its own meanings and can be comprehended by those skilled in the art, unless the terms are additionally defined in the present disclosure. That is, the terms used in the following paragraphs should be read on the meaning commonly used in the related fields and will not be overly explained, unless the terms have a specific meaning in the present disclosure.

Figure 1:
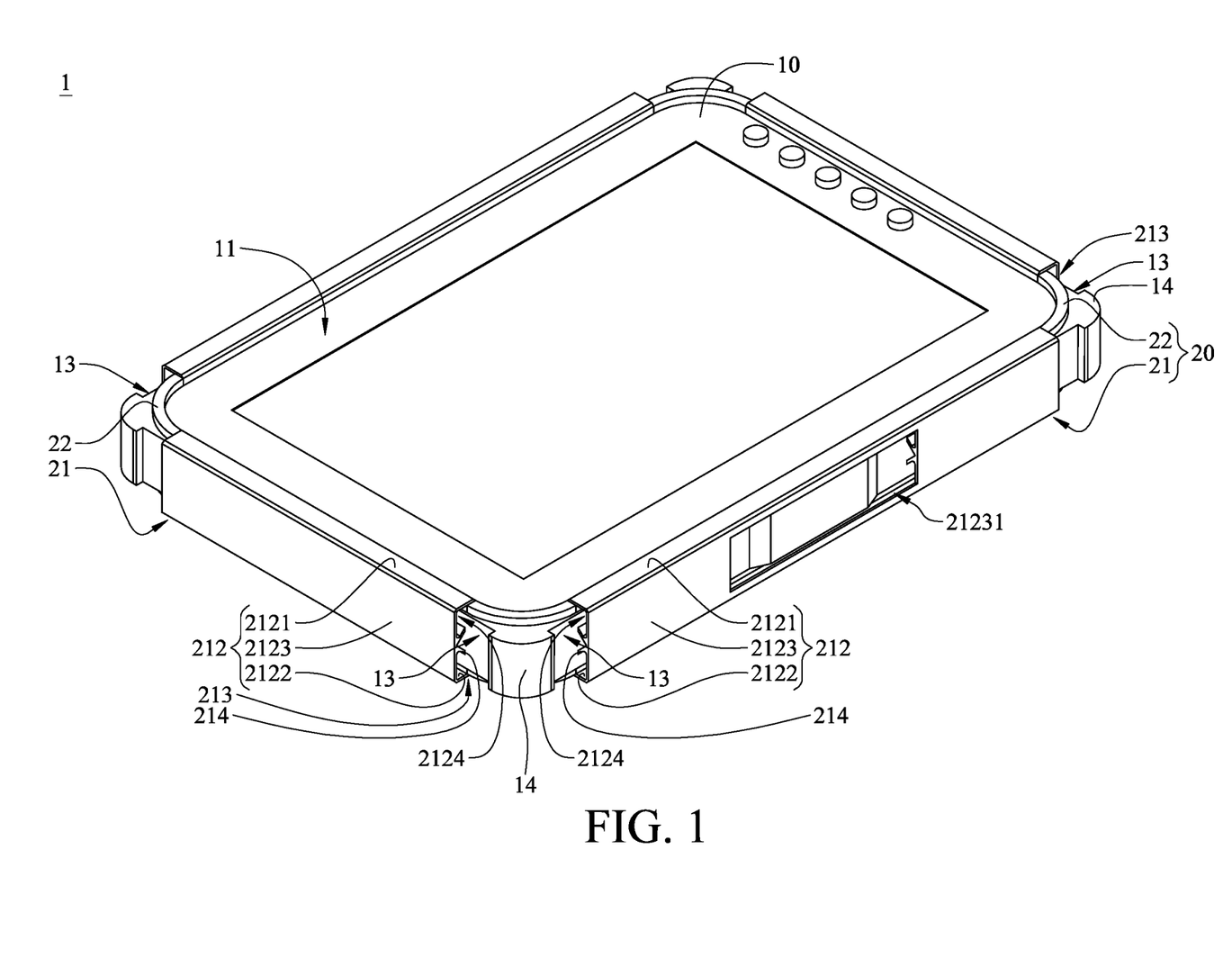
FIG. 1 is a perspective view of a portable electronic device in accordance with an embodiment of the present disclosure.
Figure 2:
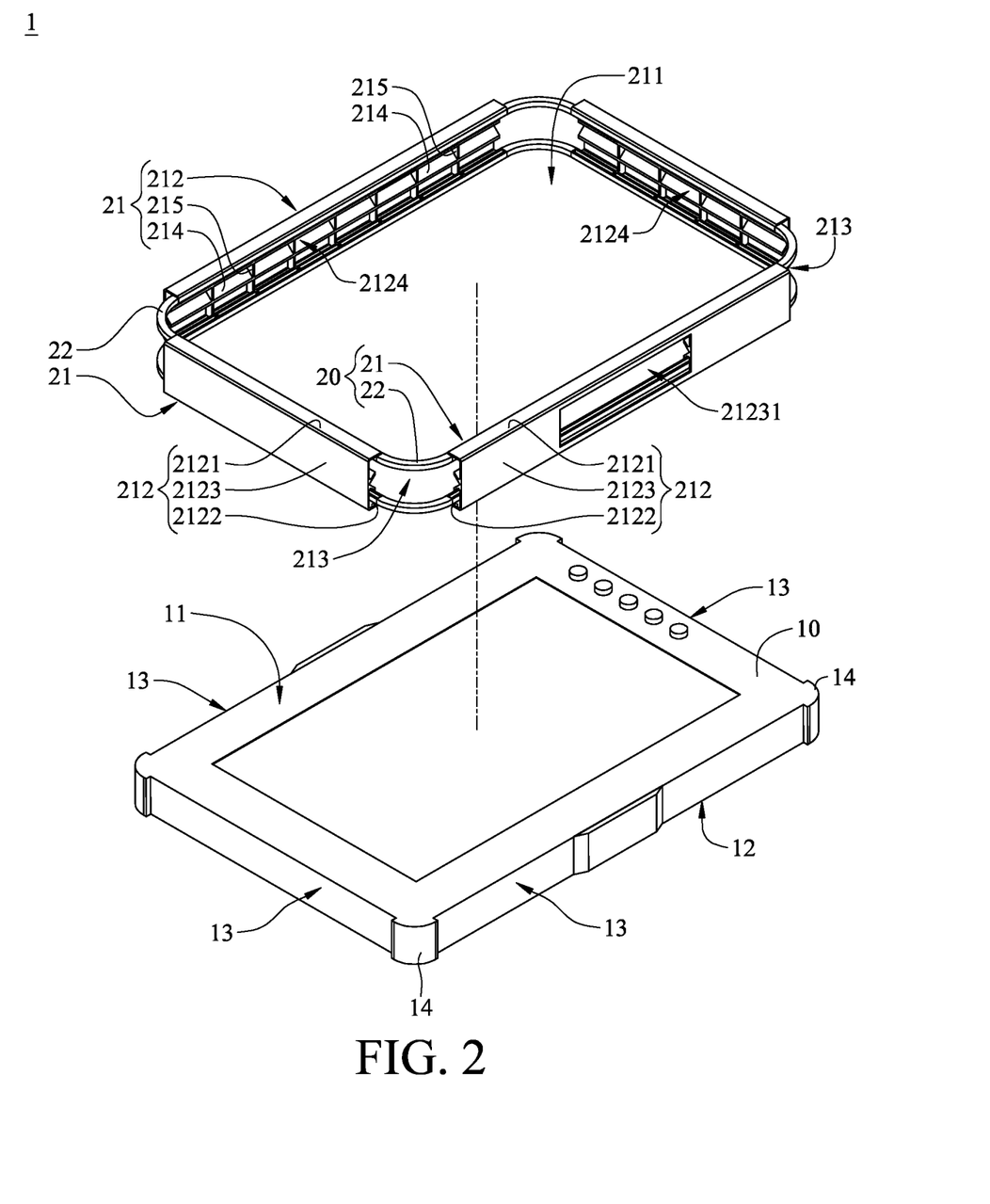
FIG. 2 is an exploded view of the portable electronic device in FIG. 1.
Figure 3:
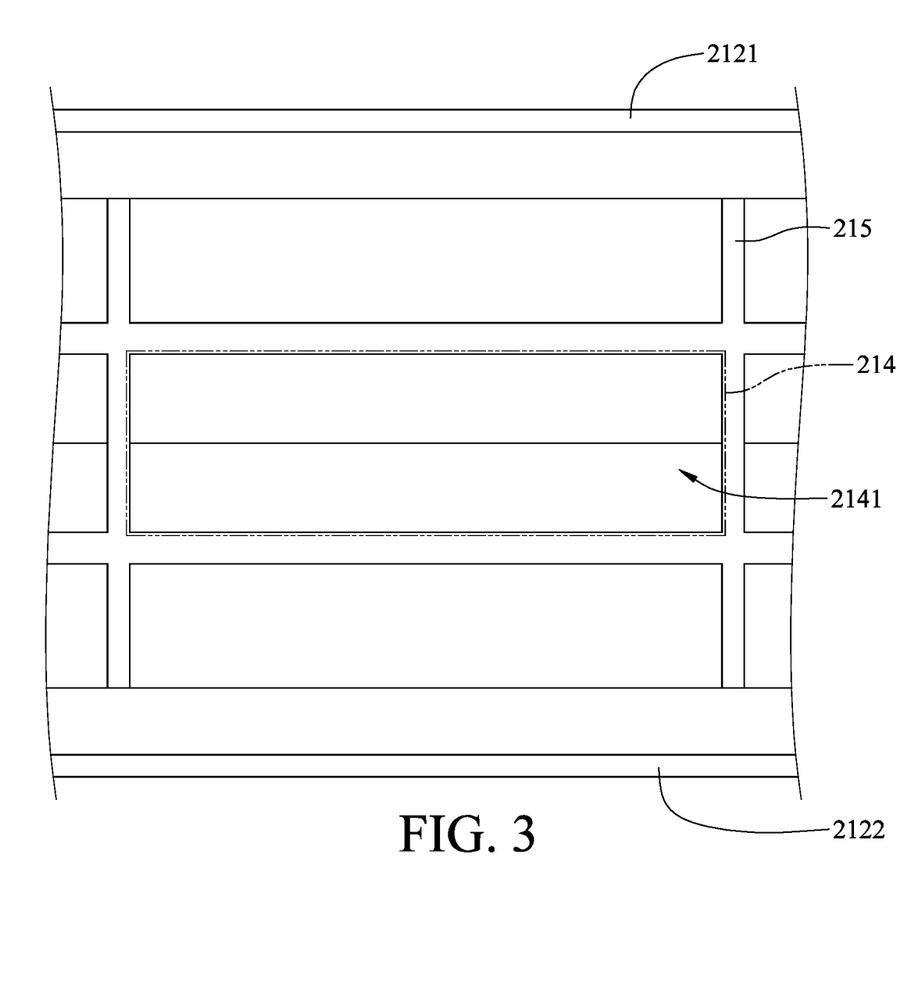
FIG. 3 is a plane view of some buffer pads in FIG. 1.

Please refer to FIG. 1 to FIG. 3, wherein FIG. 1 is a perspective view of a portable electronic device 1 in accordance with an embodiment of the present disclosure, FIG. 2 is an exploded view of the portable electronic device 1 in FIG. 1, and FIG. 3 is a plane view of some buffer pads 21 in FIG. 1.

In this embodiment, the portable electronic device 1 includes a device body 10 and a protective case 20. The device body 10 is, for example, a tablet computer, but the present disclosure is not limited thereto. In other embodiments, the device body may be, for example, at least a part of a notebook computer or a smartphone. The device body 10 has a front surface 11, a back surface 12 and four side surfaces 13. The front surface 11 and the back surface 12 are opposite to each other and are connected via the four side surfaces 13. The protective case 20 is mounted on the device body 10 and includes four buffer pads 21 and four connectors 22. The four buffer pads 21 are, for example, made of silicon or other elastic material, and together surround and form an accommodation space 211. The device body 10 is accommodated in the accommodation space 211.

Each of the buffer pads 21 includes an elastic clamping part 212, a plurality of buffer components 214 and a plurality of dividing components 215. The elastic clamping part 212 includes an upper buffer plate 2121, a lower buffer plate 2122 and a side buffer plate 2123. Two opposite sides of the side buffer plate 2123 are connected to the upper buffer plate 2121 and the lower buffer plate 2122, respectively, and the upper buffer plate 2121, the lower buffer plate 2122 and the side buffer plate 2123 together form a clamping space 2124. A side of the device body 10 is clamped by the elastic clamping part 212 in the clamping space 2124. The plurality of buffer components 214 are located in the clamping spaces 2124 and are disposed at a side of the elastic clamping parts 212. The plurality of buffer components 214 physically contact the side of the device body 10. That is, the plurality of buffer components 214 physically contact the side of the device body 10 to form a plurality of airbags so as to buffer and absorb the mechanical shock to the device body 10 when the device body 10 is hit or, for example, falls on a hard surface. The detailed structural relationship between the device body 10 and the buffer components 214 will be described later. The plurality of dividing components 215 are located in the clamping spaces 2124 and protrude from the sides of the elastic clamping parts 212. The plurality of dividing components 215 divide each of the clamping spaces 2124 into a plurality of segments. The plurality of buffer components 214 are located in the plurality of segments. The plurality of dividing components 215 divide each of the plurality of buffer components 214 into a plurality of small airbags so as to ensure the buffering effect by reducing the overall size of the plurality of buffer components 214.

An exposed space portion 213 is formed between each of all adjacent two buffer pads 21. The four connectors 22 are located in the four exposed space portions 213, respectively. Each of the connectors 22 is, for example, a rope structure. The four connectors 22 are, for example, made of plastic. Two ends of each of the connectors 22 are connected to two of the buffer pads 21 adjacent thereto, respectively. For example, the two ends of each of the connectors 22 are connected to two of the buffer pads 21 adjacent thereto via binding or other means. The four exposed space portions 213 expose four corners 14 of the device body 10, respectively. Since the four corners 14 of the device body 10 have shockproof function already, the protective case 20 merely needs to protect the four sides surfaces 13 of the device body 10 and does not need to protect the four corners 14, and the protective case 20 may expose the four corners 14 of the device body 10.

In this embodiment, since the four buffer pads 21 of the protective case 20 together surround and form the accommodation space 211, and the device body 10 is accommodated in the accommodation space 211, the four buffer pads 21 may protect the sides of the device body 10. When the sides of the device body 10 are impacted by a mechanical shock, the four buffer pads 21 may buffer and absorb the shock so as to prevent the device body 10 from being damaged.

In this embodiment, the quantities of the buffer pads 21 and the connectors 22 of the protective case 20 are four, respectively. The two ends of each of the connectors 22 are connected to two buffer pads 21 adjacent thereto, respectively, and the device body 10 such as a tablet computer may be accommodated in the accommodation space 211 together surrounded and formed by the four buffer pads 21, but the present disclosure is not limited thereto. In other embodiments, the quantities of the buffer pads and the connectors of the protective case may be three, respectively. The two ends of each of the connectors are connected to two buffer pads adjacent thereto, respectively, and the device body such as a display or a main body of a notebook computer may be accommodated in the accommodation space together surrounded and formed by the three buffer pads.

In this embodiment, one of the side buffer plates 2123 of the four buffer pads 21 has a through hole 21231, which exposes a port of the device body 10 so that external cables can be plugged into the port.

In this embodiment, the quantity of the through hole 21231 is one, and the through hole 21231 is located at one of the side buffer plates 2123 of the four buffer pads 21, but the present disclosure is not limited thereto. In other embodiments, the quantity of the through holes may be more than one, and the through holes are located at one or more of the side buffer plates of the four buffer pads, respectively.

Figure 4:
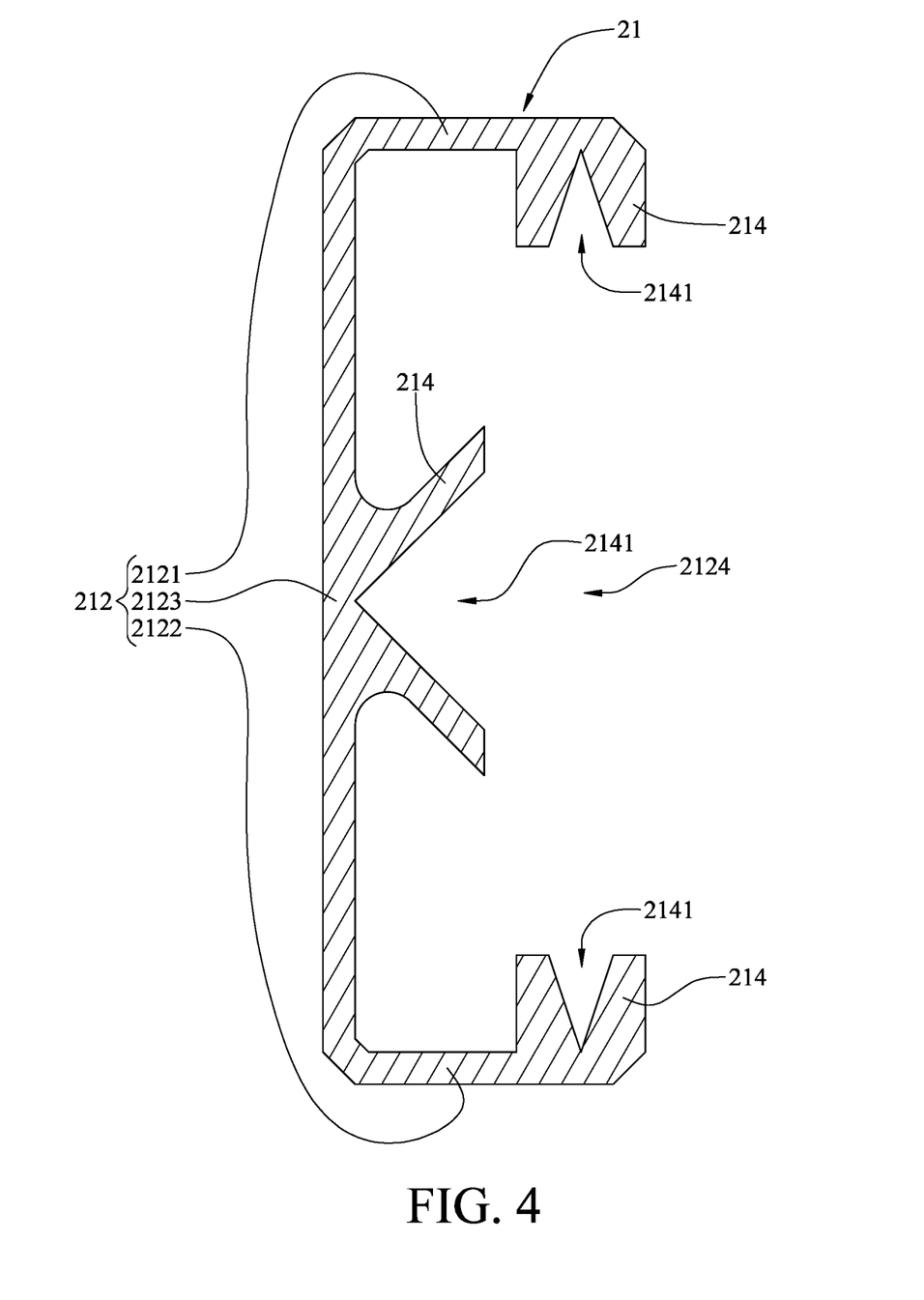
FIG. 4 is a cross-sectional view of the buffer pads in FIG. 1.
Figure 5:
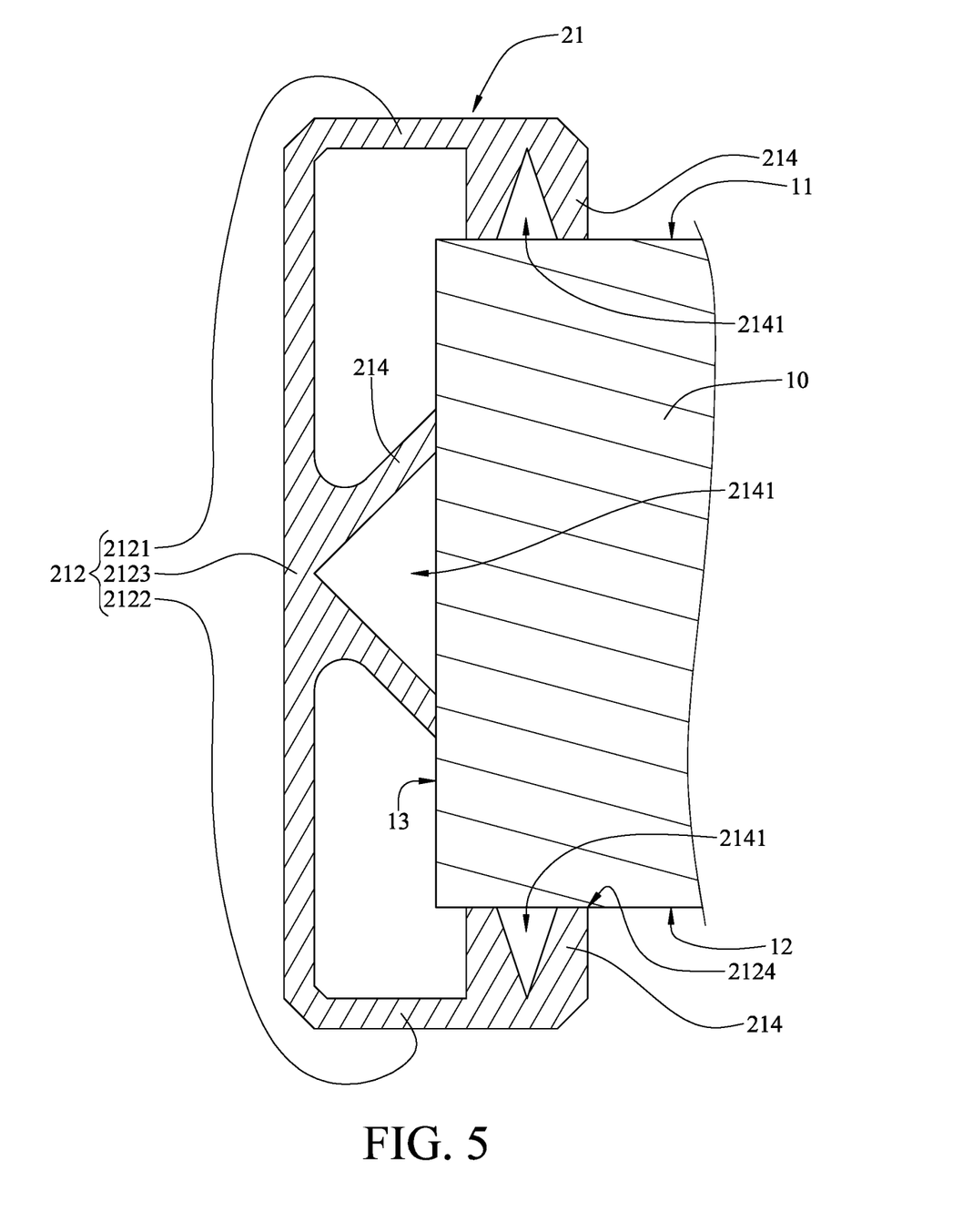
FIG. 5 is a cross-sectional view of a side of a device body located in a clamping space in FIG. 1.

Please refer to FIG. 4 and FIG. 5, wherein FIG. 4 is a cross-sectional view of buffer pads 21 in FIG. 1, and FIG. 5 is a cross-sectional view of a side of a device body 10 located in a clamping space 2124 in FIG. 1.

In this embodiment, the plurality of buffer components 214 are disposed at the upper buffer plate 2121, the lower buffer plate 2122 and the side buffer plate 2123 of each of the elastic clamping parts 212, respectively, and are located in the plurality of clamping spaces 2124. The plurality of buffer components 214 are not connected to one another. A cross-section of each of the plurality of buffer components 214 are, for example, V-shaped, U-shaped or semicircular. Each of the plurality of buffer components 214 has an opening 2141. An area of each of the openings 2141 is less than 1 cm$^2$. In detail, the device body 10 is located in the clamping spaces 2124, and the plurality of buffer components 214 physically contact the front surface 11, back surface 12 and side surfaces 13 of the device body 10, respectively so as to close the openings 2141 to form the plurality of airbags. When a side of the device body 10 on which the protective case 20 is mounted is hit, the plurality of buffer components 214 tightly contact the side of the device body 10 which is hit, such that an inflation state may be formed between the plurality of buffer components 214 and the side of the device body 10 being hit via the pressure caused by the shock to buffer and absorb the shock to prevent the device body 10 from being damaged.

Figure 6:
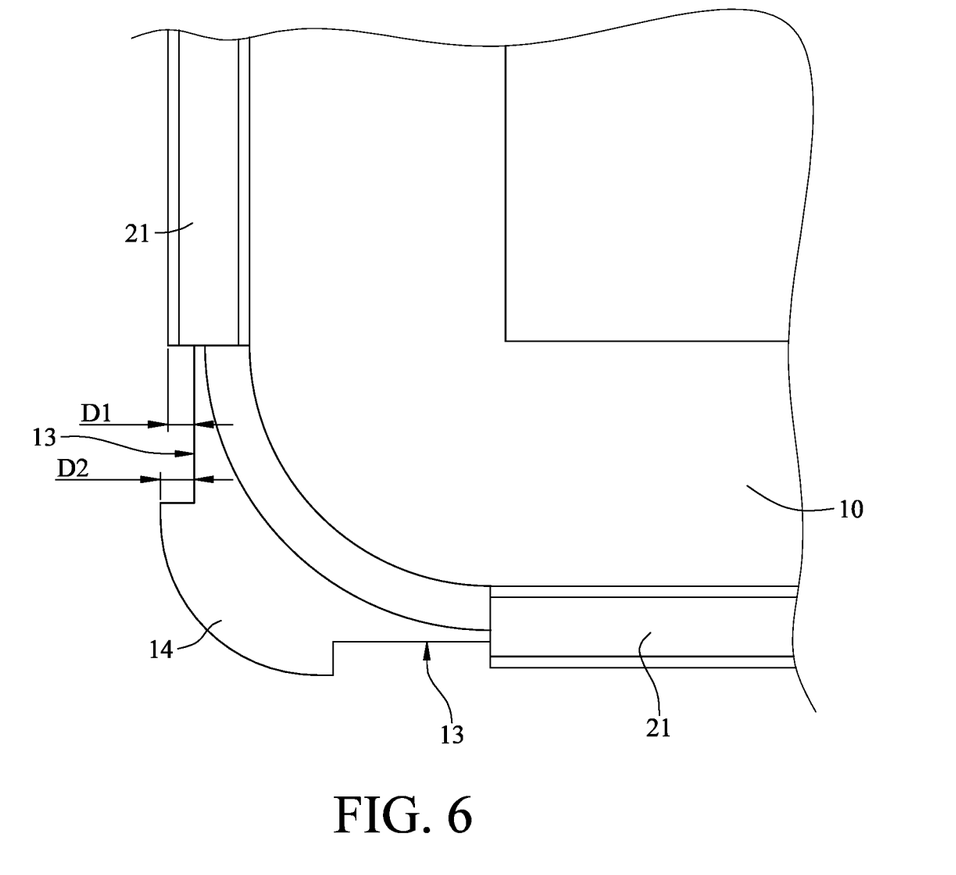
FIG. 6 is a partial plane view of the portable electronic device in FIG. 1.

Please refer to FIG. 6, which is a partial plane view of the portable electronic device 1 in FIG. 1. In this embodiment, the four side surfaces 13 of the device body 10 are connected to the four buffer pads 21, respectively. A length D1 of each of the four buffer pads 21 protruding from the side surface 13 is less than a length D2 of the any one corner 14 protruding from the device body 10. Accordingly, since the four corners 14 of the device body 10 protrude outwards more than the four buffer pads 21, the protective case 20 may expose the four corners 14 of the device body 10.

Figure 7:
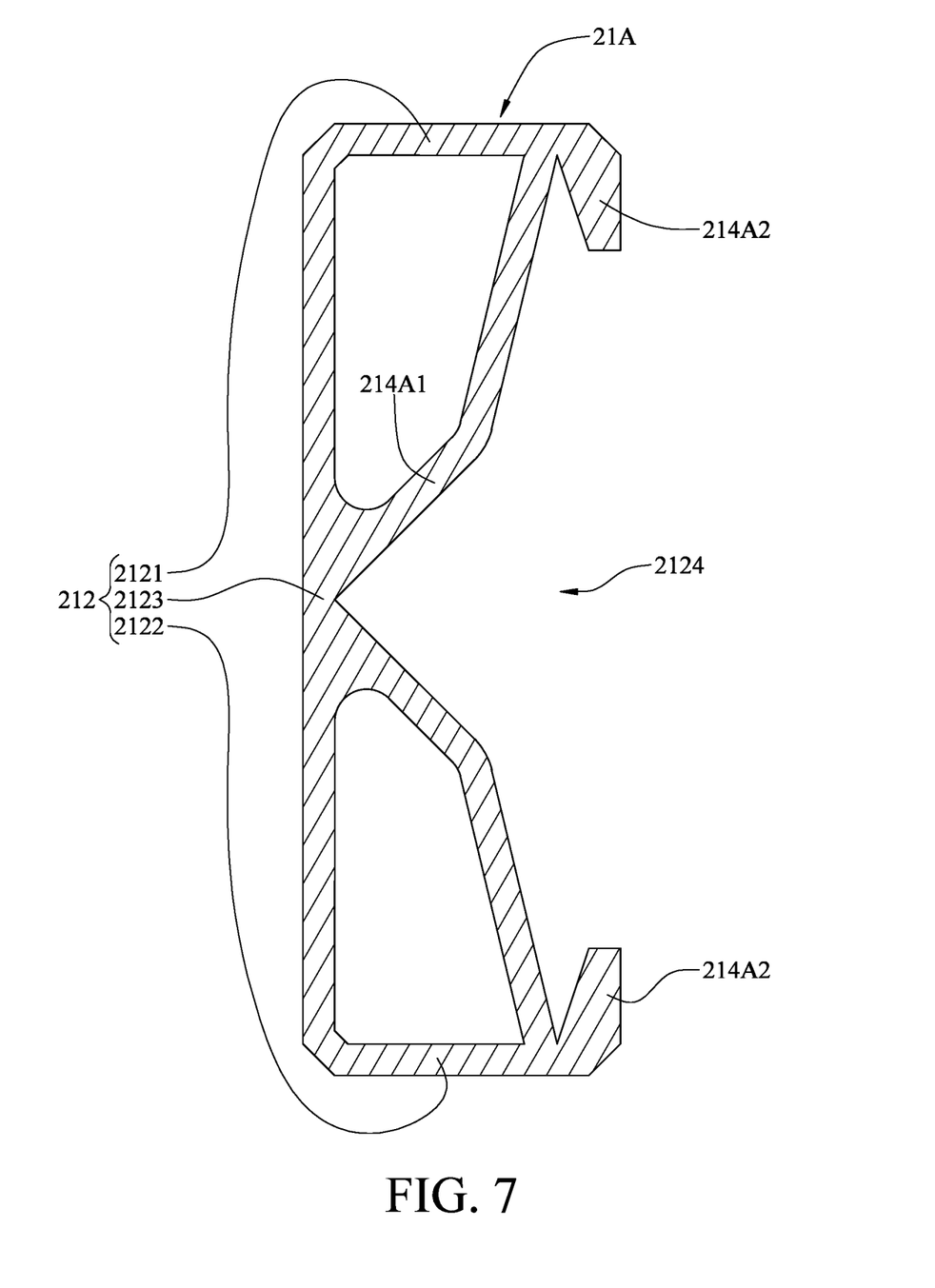
FIG. 7 is a cross-sectional view of a buffer pad of a protective case in accordance with another embodiment of the present disclosure.

Please refer to FIG. 7, which is a cross-sectional view of a buffer pad 21A of the protective case 20 in accordance with another embodiment of the present disclosure. In this embodiment, a plurality of buffer components 214A1 of each of the four buffer pads 21A located at the side buffer plate 2123 are connected to a plurality of buffer components 214A2 of each of the four buffer pads 21A located at the upper buffer plate 2121 and a plurality of buffer components 214A2 of each of the four buffer pads 21A located at the lower buffer plate 2122, respectively, and each of the plurality of buffer components 214A1, 214A2 has an opening, respectively. When a side of the device body 10 is hit, an inflation state may be formed between the plurality of buffer components 214A1, 214A2 and the side of the device body 10 being hit via the pressure caused by the shock to buffer and absorb the shock to prevent the device body 10 from being damaged.

Figure 8:
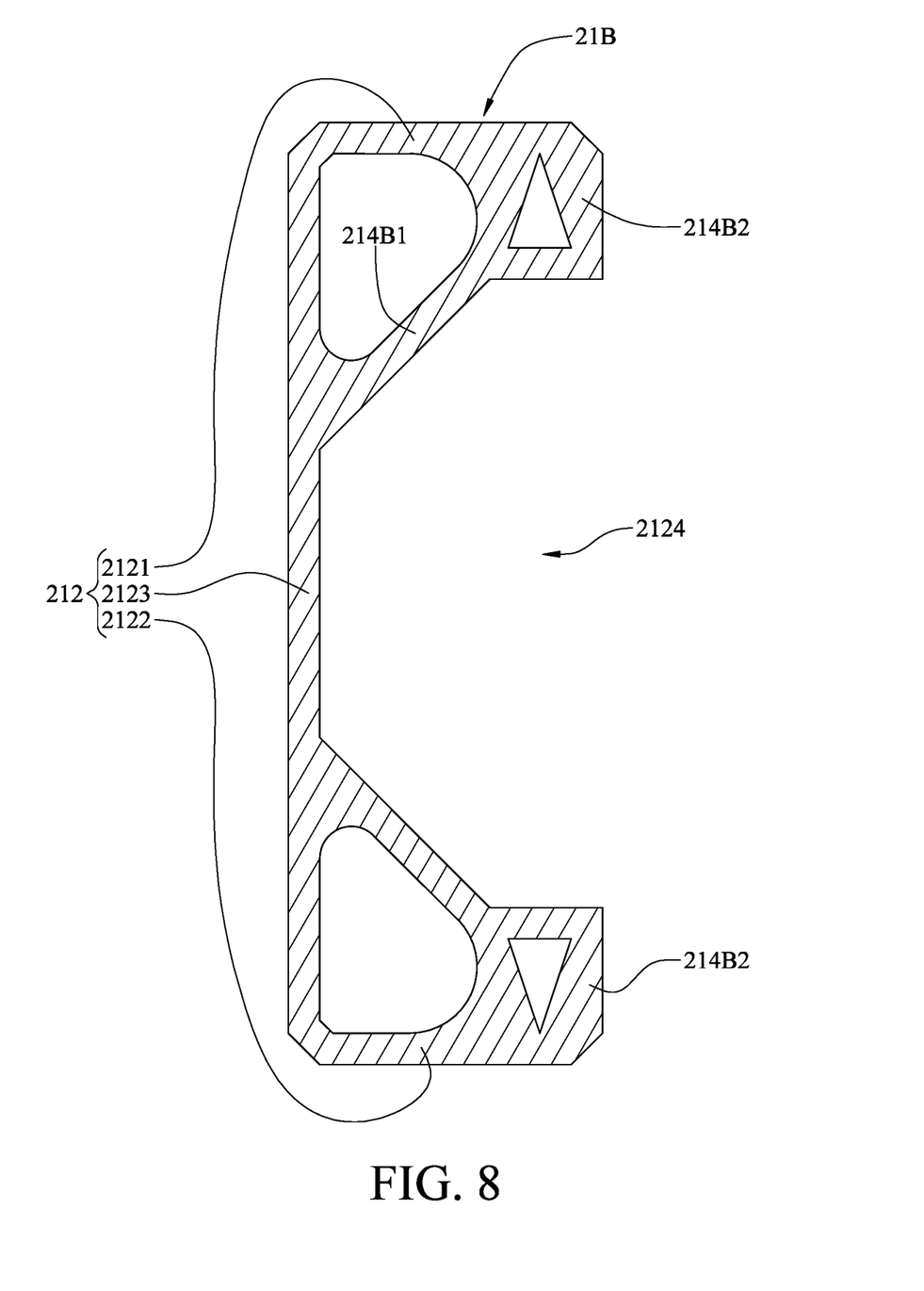
FIG. 8 is a cross-sectional view of a buffer pad of a protective case in accordance with another embodiment of the present disclosure.

Please refer to FIG. 8, which is a cross-sectional view of a buffer pad 21B of the protective case 20 in accordance with another embodiment of the present disclosure. In this embodiment, the plurality of buffer components 214B1 located at the side buffer plate 2123 of each of the four buffer pads 21B are connected to the plurality of buffer components 214B2 located at the upper buffer plate 2121 of each of the four buffer pads 21B and the plurality of buffer components 214B2 located at the lower buffer plate 2122 of each of the four buffer pads 21B. When a side of the device body 10 is hit, an inflation state may be formed between the plurality of buffer components 214B1, 214B2 and the side of the device body 10 being hit via the pressure caused by the shock to buffer and absorb the shock to prevent the device body 10 from being damaged.

Figure 9:
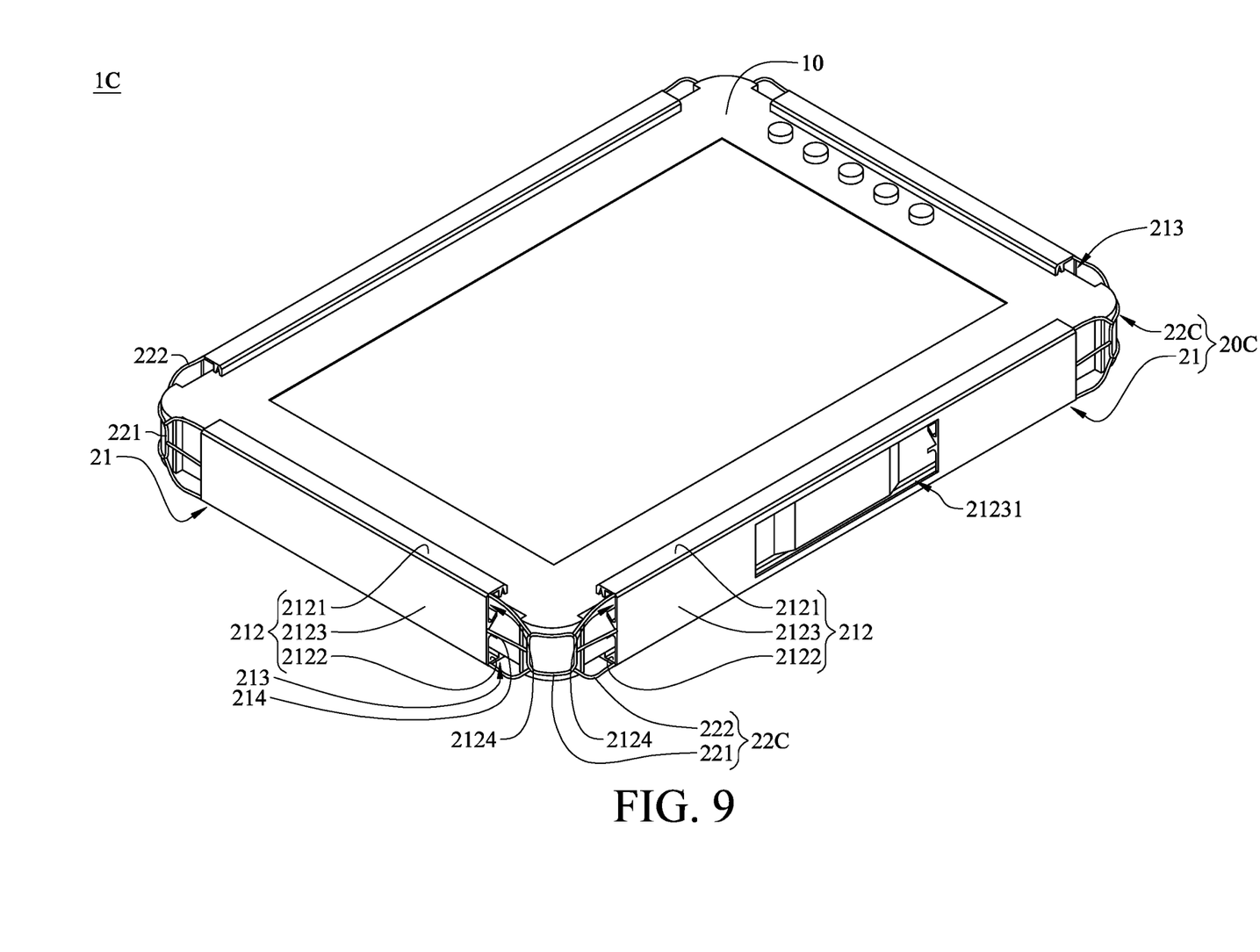
FIG. 9 is a perspective view of a portable electronic device in accordance with another embodiment of the present disclosure.
Figure 10:
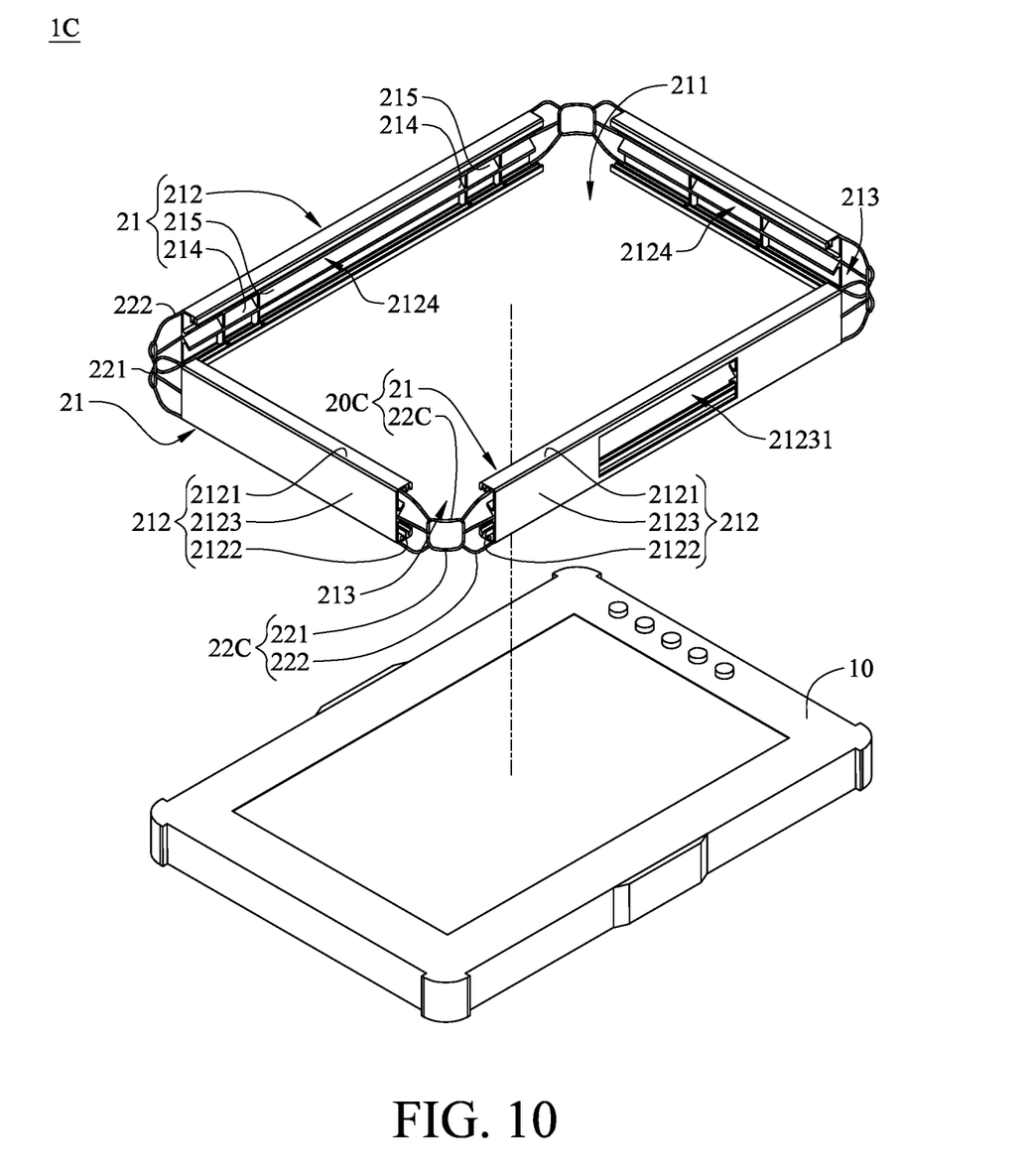
FIG. 10 is an exploded view of the portable electronic device in FIG. 9.

Please refer to FIG. 9 and FIG. 10, where FIG. 9 is a perspective view of a portable electronic device 1C in accordance with another embodiment of the present disclosure, and FIG. 10 is an exploded view of the portable electronic device 1C in FIG. 9.

The portable electronic device 1C in this embodiment is similar to the portable electronic device 1 in FIG. 1. Therefore, the differences in this embodiment will be described below, and the similarities will not be repeated. In this embodiment, an exposed space portion 213 is formed between each of all adjacent two buffer pads 21 of the portable electronic device 1C. The four connectors 22C are located in the four exposed space portions 213, respectively. Each of the connectors 22C is, for example, a mesh structure. The four connectors 22C are, for example, made of plastic. Each of the connectors 22C includes a frame 221 and a plurality of connecting parts 222. One end of each of the plurality of connecting parts 222 is integrally connected to the frame 221, and another end of each of the plurality of connecting parts 222 is integrally connected to one of the buffer pads 21 adjacent thereto. The four exposed space portions 213 expose four corners 14 of the device body 10, respectively. Since the four corners 14 of the device body 10 have shockproof function already, the protective case 20C merely needs to protect the four sides surfaces 13 of the device body 10 and does not need to protect the four corners 14, and the protective case 20C may expose the four corners 14 of the device body 10.

According to the protective case and the portable electronic device as described above, since the protective case provides additional protection to the sides of the body, if the side of the device body hits the ground or other objects, the buffer pads of the protective case may buffer and absorb the shock. Therefore, in addition to the corners of device body with the function of the shockproof, the protective case may protect the sides of the portable electronic device so as to provide comprehensive protection for the portable electronic device, thereby preventing the portable electronic device from being damaged due to mechanical shocks.

Moreover, the protective case of the present disclosure may be applied to various portable electronic devices. When the quantities of the buffer pads and the connectors of the protective case are four, respectively, the protective case may be configured to protect, for example, the device body of the tablet computer. When the quantities of the buffer pads and the connectors of the protective case are three, respectively, the protective case may be configured to protect, for example, the device body of the display panel of the notebook computer.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A protective case, comprising:
   a plurality of buffer pads, together surrounding and forming an accommodation space, wherein each of the plurality of buffer pads comprises an elastic clamping part, the elastic clamping part comprises an upper buffer plate, a lower buffer plate and a side buffer plate, two opposite sides of the side buffer plate are connected to the upper buffer plate and the lower buffer plate, respectively, and the upper buffer plate, the lower buffer plate and the side buffer plate together form a clamping space; and
   a plurality of connectors, wherein an exposed space portion is formed between any two of the plurality of buffer pads which are adjacent to each other, the plurality of connectors are located in the exposed space portions, respectively, and two ends of each of the plurality of connectors are connected to the any two of the plurality of buffer pads which are adjacent to each other, respectively;

wherein each of the plurality of buffer pads further comprises a plurality of buffer components located in the clamping spaces and disposed at a side of the elastic clamping parts;

wherein the plurality of buffer pads further comprise a plurality of dividing components, located in the clamping spaces and protruding from the side of the elastic clamping parts, the plurality of dividing components divide the clamping spaces into a plurality of segments, and the plurality of buffer components are located in the plurality of segments of the clamping spaces.

2. The protective case according to claim 1, wherein a cross-section of each of the plurality of buffer components is V-shaped, U-shaped or semicircular.

3. The protective case according to claim 2, wherein an area of an opening of each of the plurality of buffer components is less than 1 cm$^2$.

4. The protective case according to claim 1, wherein the plurality of connectors are a plurality of rope structures, the plurality of rope structures are made of plastic, and two ends of each of the plurality of rope structures are connected to the any two of the plurality of buffer pads which are adjacent to each other, respectively.

5. The protective case according to claim 1, wherein the plurality of connectors are a plurality of mesh structures, each of the plurality of connectors comprises a frame and a plurality of connecting parts, one end of each of the plurality of connecting parts is connected to the frame, and another end of the plurality of connecting parts is connected to one of the buffer pads.

6. The protective case according to claim 5, wherein the plurality of mesh structures are made of plastic.

7. The protective case according to claim 1, wherein one of the plurality of side buffer plates has at least one hole.

8. The protective case according to claim 1, wherein the plurality of buffer pads are made of silicon.

9. A portable electronic device, comprising:
a device body; and
a protective case, mounted on the device body, comprising:
  a plurality of buffer pads, together surrounding and forming an accommodation space, wherein the device body is accommodated in the accommodation space, each of the plurality of buffer pads comprises an elastic clamping part, the elastic clamping part comprises an upper buffer plate, a lower buffer plate and a side buffer plate, two opposite sides of the side buffer plate are connected to the upper buffer plate and the lower buffer plate, respectively, the upper buffer plate, the lower buffer plate and the side buffer plate together form a clamping space, and a side of the device body is clamped by the elastic clamping part in the clamping space; and
  a plurality of connectors, wherein an exposed space portion is formed between any two of the plurality of buffer pads which are adjacent to each other, the plurality of connectors are located in the exposed space portions, respectively, and two ends of each of the plurality of connectors are connected to any two of the plurality of buffer pads which are adjacent to each other, respectively, the exposed space portions expose corners of the device body;

wherein the plurality of buffer pads further comprise a plurality of dividing components and has a plurality of buffer components, the plurality of dividing components are located in the clamping spaces, and protrude from the side of the elastic clamping parts, the plurality of dividing components divide the clamping spaces into a plurality of segments, the plurality of buffer components are located in the plurality of segments of the clamping spaces and are disposed at a side of the elastic clamping parts, and the plurality of buffer components physically contact the side of the device body.

10. The portable electronic device according to claim 9, wherein a cross-section of each of the plurality of buffer components is V-shaped, U-shaped or semicircular.

11. The portable electronic device according to claim 9, wherein the plurality of connectors are a plurality of rope structures, the plurality of rope structures are made of plastic, and two ends of each of the plurality of rope structures are connected to the any two of the plurality of buffer pads which are adjacent to each other, respectively.

12. The portable electronic device according to claim 9, wherein the plurality of connectors are a plurality of mesh structures, the plurality of mesh structures are made of plastic, and two ends of each of the plurality of mesh structures are integrally connected to any two of the plurality of buffer pads which are adjacent to each other, respectively.

13. The portable electronic device according to claim 9, wherein at least one of the side buffer plates of the plurality of buffer pads has at least one through hole to expose at least one port of the device body.

14. The portable electronic device according to claim 9, wherein the device body has a plurality of side surfaces, the plurality of side surfaces are connected to the plurality of buffer pads, respectively, and a length of each of the plurality of buffer pads protruding from the side surface is less than a length of the corner protruding from the device body.

* * * * *